United States Patent
Ghasemi et al.

(10) Patent No.: US 12,259,068 B2
(45) Date of Patent: Mar. 25, 2025

(54) THREADED AND COUPLED TUBULAR CONNECTION INCORPORATING A SEAL RING AND METHOD OF MAKE-UP

(71) Applicant: Hunting Energy Services, LLC, Houston, TX (US)

(72) Inventors: Ryan Gholamreza Ghasemi, Houston, TX (US); Aaron Walsh, Houston, TX (US); Stephen Harvey, Houston, TX (US)

(73) Assignee: Hunting Energy Services, LLC, Houston, TX (US)

( * ) Notice: Subject to any disclaimer, the term of this patent is extended or adjusted under 35 U.S.C. 154(b) by 86 days.

(21) Appl. No.: 18/450,752

(22) Filed: Aug. 16, 2023

(65) Prior Publication Data

US 2025/0060058 A1  Feb. 20, 2025

(51) Int. Cl.
*F16L 15/00* (2006.01)
*E21B 17/042* (2006.01)

(52) U.S. Cl.
CPC .......... *F16L 15/003* (2013.01); *E21B 17/042* (2013.01)

(58) Field of Classification Search
CPC ..... F16L 15/003; F16L 15/008; F16L 15/001; F16L 15/04; E21B 17/042
See application file for complete search history.

(56) References Cited

U.S. PATENT DOCUMENTS

| | | | |
|---|---|---|---|
| 2,487,241 A | | 11/1949 | Hilton |
| 3,266,821 A | * | 8/1966 | Safford ................... F16L 15/04 |
| 4,595,219 A | | 6/1986 | Lenze et al. |
| 4,614,120 A | | 9/1986 | Fradin et al. |
| 4,679,831 A | | 7/1987 | Kielminski |
| 4,697,831 A | | 7/1987 | Kielminski |
| 4,712,815 A | | 12/1987 | Reeves |
| 4,835,873 A | | 6/1989 | Weems |
| 4,856,828 A | * | 8/1989 | Kessler .................. F16L 15/001 |
| 4,875,713 A | * | 10/1989 | Carstensen ........... F16L 15/008 |
| 4,962,579 A | | 10/1990 | Moyer et al. |
| 5,212,885 A | | 5/1993 | Buonodono et al. |
| 5,236,230 A | | 8/1993 | Mudge, Jr. et al. |
| 5,263,748 A | * | 11/1993 | Carstensen ........... F16L 15/003 |

(Continued)

OTHER PUBLICATIONS

International Search Report issued for PCT/US2024/041903; dated Oct. 22, 2024; 3 pages.

(Continued)

*Primary Examiner* — William S. Choi (74) *Attorney, Agent, or Firm* — Whitaker Chalk Swindle & Schwartz PLLC; Charles D. Gunter, Jr.

(57) ABSTRACT

A method by which threaded sections of oil field pipe are connected to form a coupled and sealed tubular connection having proper sealing positioning at proper make-up torque. A tubular coupling has box ends and an internal mid region which forms interior shoulder regions. A seal ring is received on the mid region and mates with the end faces of the coupling shoulder and with a centrally located groove on the shoulder. The pin ends of opposing sections of pipe are received within the oppositely arranged box ends of the coupling and are made-up to a final, desired make-up position. The final position and amount of squeeze on the seal ring are controlled by utilizing the contact between the pipe pin ends and the shoulder regions of the coupling.

18 Claims, 9 Drawing Sheets

(56) References Cited

U.S. PATENT DOCUMENTS

| | | | |
|---|---|---|---|
| 5,661,888 A | | 9/1997 | Hanslik |
| 5,779,276 A | | 7/1998 | Allen |
| 5,931,511 A | | 8/1999 | Delange et al. |
| 6,042,153 A | * | 3/2000 | DeLange ............... E21B 17/042 |
| 6,176,524 B1 | | 1/2001 | Tsuru et al. |
| 6,312,024 B1 | * | 11/2001 | Dutilleul ............... F16L 15/003 |
| 6,363,598 B1 | | 4/2002 | Staudt et al. |
| 6,899,356 B2 | | 5/2005 | Slack et al. |
| 8,091,930 B2 | | 1/2012 | Robichaux et al. |
| 8,496,273 B1 | | 7/2013 | Carstensen |
| 9,243,729 B2 | | 1/2016 | Rivero et al. |
| 9,982,814 B1 | * | 5/2018 | Carstensen ........... E21B 17/042 |
| 2013/0264819 A1 | | 10/2013 | Ischebeck et al. |
| 2013/0300112 A1 | * | 11/2013 | Shand ................... E21B 17/042 |
| 2016/0298400 A1 | | 10/2016 | Sabatier |
| 2022/0364420 A1 | | 11/2022 | López Robayo |

OTHER PUBLICATIONS

Written Opinion issued for PCT/US2024/041903; dated Oct. 22, 2024; 16 pages.

* cited by examiner

THREADED AND COUPLED TUBULAR CONNECTION INCORPORATING A SEAL RING AND METHOD OF MAKE-UP

BACKGROUND OF THE INVENTION

1. Field of the Invention

The present invention relates generally to pipe joints in a pipe string, such as the internally threaded couplings used on oil field tubular goods, and more specifically, to a tubular connection and to a make-up method for such a connection, which uses an internal coupling shoulder and the squeeze on a resilient seal ring carried on the shoulder to positionally make-up the connection.

2. Description of the Prior Art

A wide variety of drill pipe, tubing and casing (tubular goods) for oil and gas drilling, completion, production and stimulation activities are available at the present time. In the case of sections of such tubular goods used in the oil field (for example long sections of well casing or tubing), such sections of pipe usually have an exteriorly-threaded male end called a pin member. Such pin members are threaded into couplings, collars or integral female pipe sections, having threaded ends referred to as the box member. These box members, including coupling members, have interiorly-threaded thread surfaces corresponding to their respective pin members for mating with the pin members to form threaded connections.

One type of connection for these joints is the American Petroleum Institute ("API") threaded and coupled connection. These tapered connections provide increasing bearing stresses to provide the seal between the pin member and box member with increasing engagement produced by rotational torque. It is well known in the petroleum industry that the performance of an API connection is highly dependent on the make-up assembly (engagement) condition of the joint, and therefore it is important to determine if the joint is made-up properly. A number of factors can affect the integrity of the assembly process, including friction-related factors such as thread dope, plating type and thickness, surface finishes, eccentricity, ovality, impurities (dirt or rust) and external factors such as stab alignment and wind loading that occur at the well site.

A number of methods have been used in the prior art in order to monitor and control make-up of the previously described oilfield tubular connections. One type of method is the "torque-only" method based upon the read-out of a load cell attached to the joint or power make-up tongs and calibrated for torque.

A second method, "torque-turn", requires sophisticated electronics including a computer and sensors to monitor both the torque and turns which add to operational costs and delay the running time of the pipe sections. The "torque-turn" method is extremely sensitive to a reference torque which is a relatively low value, typically 10 percent of the minimum torque. This torque is sometimes determined by API torque recommendations. After this reference torque is reached, a predetermined number of turns are counted in the make-up of the tubular connection. If a false reference torque occurs to activate the turn counter because of one of the above described quality control problems or assembly conditions, an improper joint make-up will result.

A third method is where the torque imposed on premium thread connections between tubular joints is monitored and plotted as a function of time rather than the number of turns. In this manner, the torque can be detected at the time metal-to-metal sealing contact is achieved during make-up of the connection. Further, torque response of the connection may be monitored after shouldering occurs.

Despite the above advances, there has been a long-felt need in the oil and gas industry for a simplified method of determining in the field the integrity of such joint make-up, thereby avoiding the need for complex instrumentation such as used in the "torque-turn" or "torque-time" methods or the need for elaborate calibration methods for the instrumentation involved. Proposed methods have included the use of barrettes, measuring from the open end of the pipe and the use of a permanent mark on the outer diameter of the pipe. Each of these techniques has some disadvantage.

The following references are typical of the attempts in the prior art to solve the above described problems, but should be understood as being only representative of the prior art in the field. U.S. Pat. No. 3,363,598 issued Apr. 2, 2002, to Staudt et al., describes a method of assembling pipe joints in a pipe string which allows the circumferential orientation of a first pipe in the pipe string to be determined relative to a second pipe in the pipe string. Threads are created for the pin member and the coupling member of each joint, and each pin member and coupling member is marked with an alignment mark. The threads for each pin member are created so that they are identical to the threads on the other pin members in the pipe string. This is done by gaging the overall rotational capacity of each pin member with a coupling marking gage and adjusting a thread depth as needed. The threads for each coupling member are created so that they are identical to the threads on other coupling members in the pipe string. This is done by gaging the overall rotational capacity of each coupling member with a pin marking gage and adjusting a shoulder stop depth as needed. After threading the pin members and the coupling members, the joints are assembled, and the alignment mark for each pin member and each coupling member is aligned with the alignment mark on each of the other pin and coupling members in the pipe string.

U.S. Pat. No. 4,962,579 teaches a method for visually determining on the rig floor if a joint is properly made up with the right amount of torque. A registry mark is placed on the exterior of the first pipe section for proper axial engagement of the pin member with the coupling or box member. The position is determined by finite element analysis.

U.S. Pat. No. 5,212,885 shows a method for achieving proper sealing positioning and proper make up torque of threaded pipe sections. If the face of the box member is properly positioned relative to a triangle mark on the pipe section, make up is terminated. If the face has not reached edge of the triangle mark, torque is increased until either the face progresses into the body of the triangle mark or until maximum torque occurs.

U.S. Pat. No. 4,614,120 shows a method for determining proper make-up torque for pipe joints. A reference mark is set on the male element and on the female element. A grease is applied to the joint and the joint is made up using sufficient torque to cause one element to rotate with the respect to the other element. The joint is torqued until one element reaches a predetermined angle beyond the point where the reference marks are facing each other. This operation is repeated with a determination being made of the range of torques to be applied to the joint with a particular grease being utilized.

U.S. Pat. No. 5,661,888 shows an apparatus for positing two threaded pipes within a target range of relative axial positions. The device supposedly offers advantages over using visual "bench marks" placed on the pin and box members. The device includes a sensor and calibrating device for positioning the sensor a calibrated distance from the end of one of the pipes. A signal generator generates a signal once the sensor head indicates that the relative axial position of the pipes are within the target range desired.

Even while using these above methods for making up joints, problems still continue to arise, and the industry still suffers problems when forming such joints. Thus, a need continues to exist, for an improved method for determining the position make-up of connections on pipe, such as couplings used on oil field tubular goods and similar connections.

A need also exists for such a method which does not require elaborate gaging systems or electronic sensors or sensing systems.

A need also exists for such a method which does not add appreciably to the costs of the pipe threading process, which is simple to implement, and which is reliable in operation.

SUMMARY OF THE INVENTION

A threaded and coupled connection for oil field tubular goods is shown which features a coupling member for coupling a pair of axially aligned sections of pipe. The cylindrical coupling member has an exterior, an interior defined by an internal diameter having a center point, and having opposing ends, the opposing ends each having internally threaded regions with internal threads which extend inwardly from each of the opposing ends toward the center point of the coupling. The pipes have pipe pin ends with external threads provided on the pin ends so that each pipe pin end can be axially aligned and received within a respective opposing end of the coupling member with the pin end threads matingly engaging the internal threads of the coupling member.

The cylindrical coupling member is provided with a mid-region of decreased internal diameter between the two opposing internally threaded regions, the region of decreased internal diameter forming an internal shoulder region integral with the coupling. The internal shoulder region has oppositely arranged stepped end faces joined by a diametral mid-region which forms an exposed circumferential face circumscribing the internal diameter of the mid-region of the coupling member. The circumferential face has a centrally located groove which circumscribes the face region.

The connection also uses a resilient, corrosion resistant seal ring having a circumferential exterior face and a circumferential interior face. The exterior face of the ring has a pair of oppositely arranged protruding end regions and a central protruding region spaced mid-say between the end regions. These seal regions are arranged to mate with the oppositely arranged stepped end faces and centrally located groove, respectively, provided on the internal shoulder region of the cylindrical coupling member. These mating features serve to hold the ring securely on the shoulder region prior to assembly and as the seal ring is compressed between the pin ends of the axially aligned pipes when the connection is made-up. The connection has a desired, final make-up position. This position, and the amount of squeeze on the seal ring are controlled by utilizing the shoulder contact between the pipe pin ends and the shoulder regions of the coupling.

Preferably, the oppositely arranged protruding end regions of the seal ring each have an outer contact face for contacting an adjacent stepped face of the shoulder region of the coupling as the coupling is made up. A predetermined gap "g" initially exists between the oppositely arranged protruding end regions of the seal ring and the exposed circumferential face regions of the coupling. The gap has a predetermined width, whereby the connection has a desired, final make-up position and amount of squeeze on the seal ring are controlled by utilizing the shoulder contact with the pipe pin ends, as the coupling is made up. The gap allows a squeeze region defined between the end faces of the seal ring and the pin end faces, the squeeze region being in the range from about 0.010 to 0.015 inches. In one preferred case, the squeeze region is approximately 0.012 inches.

There is also a defined effective shoulder contact area between the pipe pin ends and the respective oppositely arranged stepped end faces of the shoulder region of the coupling member. That area is determined, in part, by the height of the selected end region of the seal ring. In one exemplary case, the height of the selected end region of the seal ring is in the range from about 0.090 to 0.180 inches. In one particularly preferred case, the height of the selected end region of the seal ring is approximately 0.156 inches.

A method is also shown for connecting threaded sections of oil field pipe to form a coupled, made-up tubular connection having proper sealing positioning at proper make-up torque where method comprises the steps of:
  providing a first section of pipe in the form of a pipe pin member including an externally threaded pipe pin end;
  providing a second section of pipe in the form of a similar pipe pin end;
  providing a tubular coupling member having oppositely arranged internally threaded box ends;
  installing a selected box end of the tubular coupling onto the first pin pipe end hand tight;
  thereafter using a power torque device to torque the pipe coupling onto the first pipe spin end to a final position;
  verifying the final position of the position made-up tubular connection to ensure that the final position is within a specified tolerance;
  repeating the process for the second pipe pin end and the opposite end of the tubular coupling;
  wherein the cylindrical coupling member has an exterior, an interior defined by an internal diameter having a center point, and having opposing ends, the opposing ends each having internally threaded regions with internal threads which taper inwardly from each of the opposing ends toward the center point of the coupling so as to mate with external threads provided on pin ends of two axially aligned pipes to be joined by the coupling;
  wherein the cylindrical coupling member is provided with a mid-region of decreased internal diameter between the two opposing internally threaded regions which forms an internal shoulder region integral with the coupling, the internal shoulder region having oppositely arranged stepped end faces joined by a diametral mid-region which forms an exposed circumferential face region circumscribing the internal diameter of the mid-region of the coupling member, the circumferential face region having a centrally located groove which circumscribes the face region;
  providing a resilient, corrosion resistant seal ring having a pair of oppositely arranged end protruding regions and a central protruding region which are arranged to mate with the oppositely arranged stepped end faces and centrally located groove, respectively, provided on the internal shoulder region of the cylindrical coupling member to hold the ring on the shoulder region when the seal ring is compressed between the pin ends of the axially aligned pipes as the connection is made-up;

wherein the connection has a defined final make-up position, which position and the amount of squeeze on the seal ring are controlled by utilizing the shoulder contact between the pin ends and the shoulder regions of the coupling;

wherein the oppositely arranged protruding end regions of the seal ring each have outer contact faces for contacting an adjacent stepped face of the shoulder region of the coupling as the coupling is made up and wherein a gap initially exists between the oppositely arranged protruding end regions of the seal ring and the exposed circumferential face regions of the coupling, the gap being of a predetermined width, whereby the connection has a desired, final make-up position and where the final make-up position and the amount of squeeze on the seal ring are controlled by utilizing the shoulder contact with the pipe pin ends as the coupling is made-up.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

The components of a threaded and coupled tubular connection made-up using the method of the present invention are shown in the cross-sectional view of FIG. 1 of the drawings and will be discussed in detail below. The term "make-up" will be taken to mean the power tight application of a coupling or box connector to a pin connector. The present invention can be used with, for example, oil field tubing or casing. The connection of the invention is especially useful for tubular couplings or collars, and particularly with coated tubular designs which have internal shoulder stops.

One exemplary prior art connection of the general type under consideration, which is sold commercially by Hunting Energy Services, LLC, is the SEAL-LOCK® HT-S TIMED connection. This prior art connection is a non-upset threaded and coupled connection with mating pin ends which create a positive torque stop as a result of the shouldering pin noses upon make-up. However, this connection lacks the internal seal ring and make-up position features of the connection of the invention and is intended to be merely representative of the general state-of-the-art in this type of threaded connection.

The present invention is advantageously used with a threaded and coupled connection of this general type and may be considered an improvement over this and other prior art designs. The connection of the invention, as will be more fully described, achieves its connection without complicated instrumentation or external witness marks, or the like, and without requiring specialized thread forms to function. Using the principles of the invention, the new threaded connection achieves its desired sealing at proper axial positioning at proper make-up torque as will be explained in greater detail.

Figure 8:
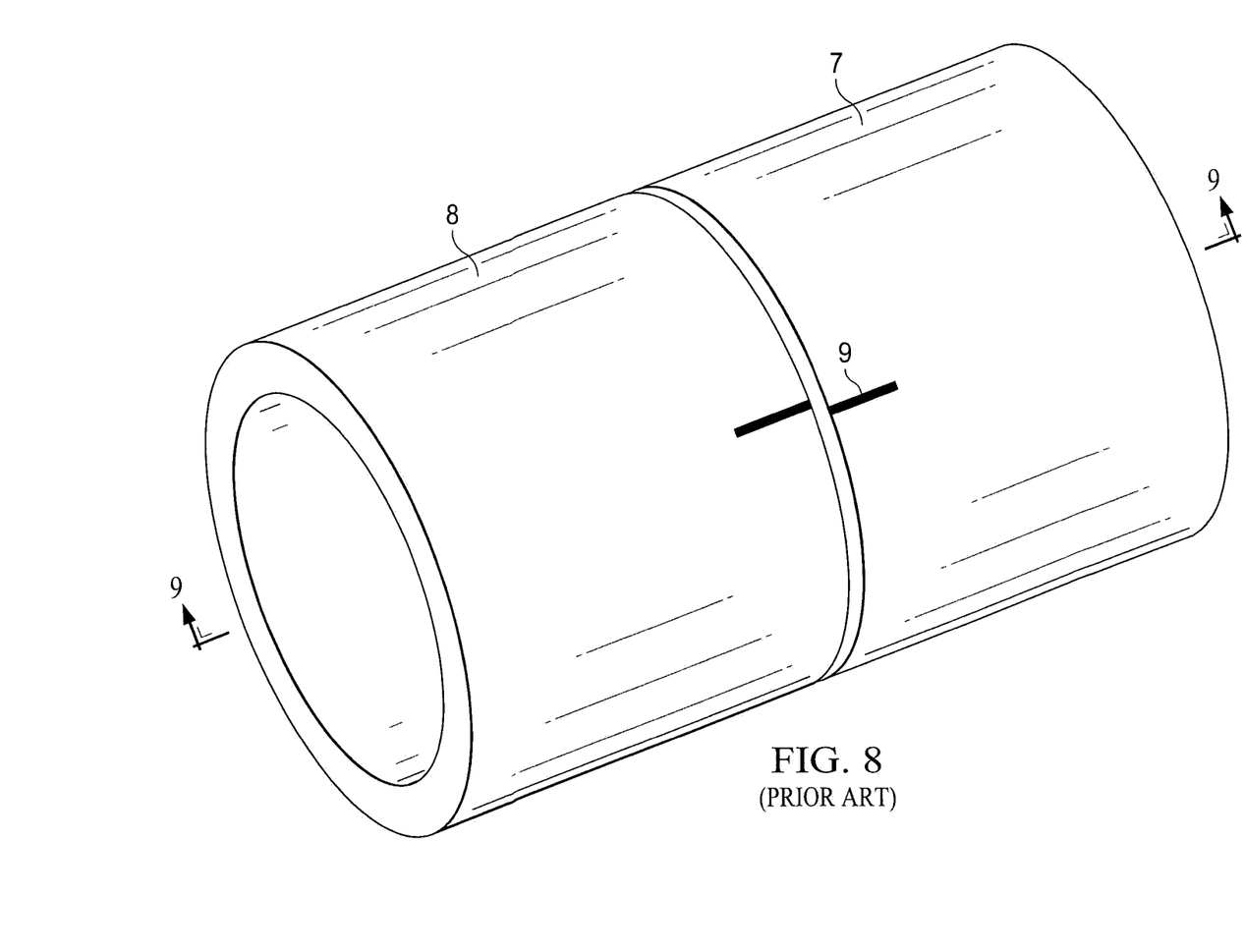
FIG. 8 is a perspective view of a prior art tubular connection of the type which used witness marks on the exterior of the pipes to achieve the make-up position of the connection.
Figure 9:
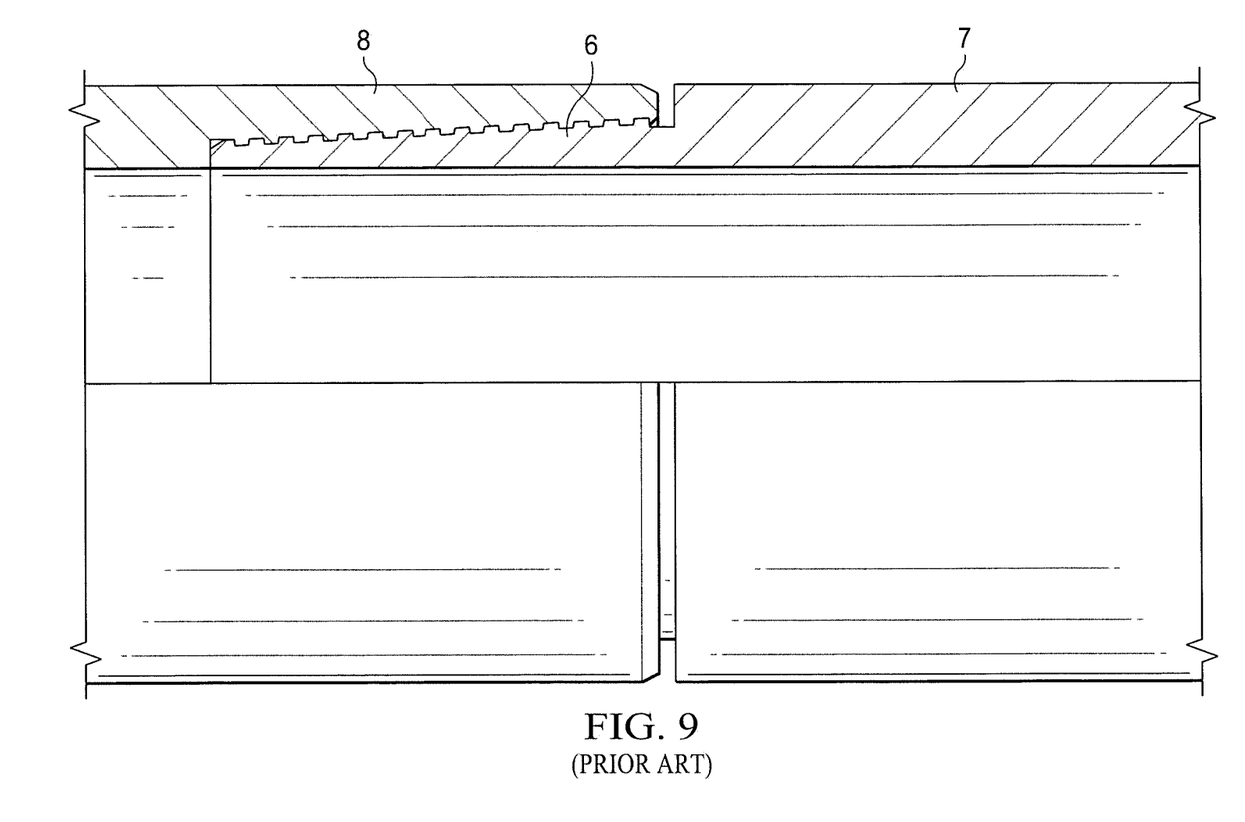
FIG. 9 is another view of the prior art connection, in this case a cross sectional view taken along lines 9-9 in FIG. 8.

FIGS. 8 and 9 are views of a prior art make-up system used to threadedly engage a pin pipe end 6 of a male pipe 7 with the internally threaded end 8 of a female, box pipe end. FIG. 8 shows the "witness marks" 9 used to align the pipes during make-up. This procedure is to be contrasted with the method of the invention, as will be described more fully in the description which follows.

Figure 1:
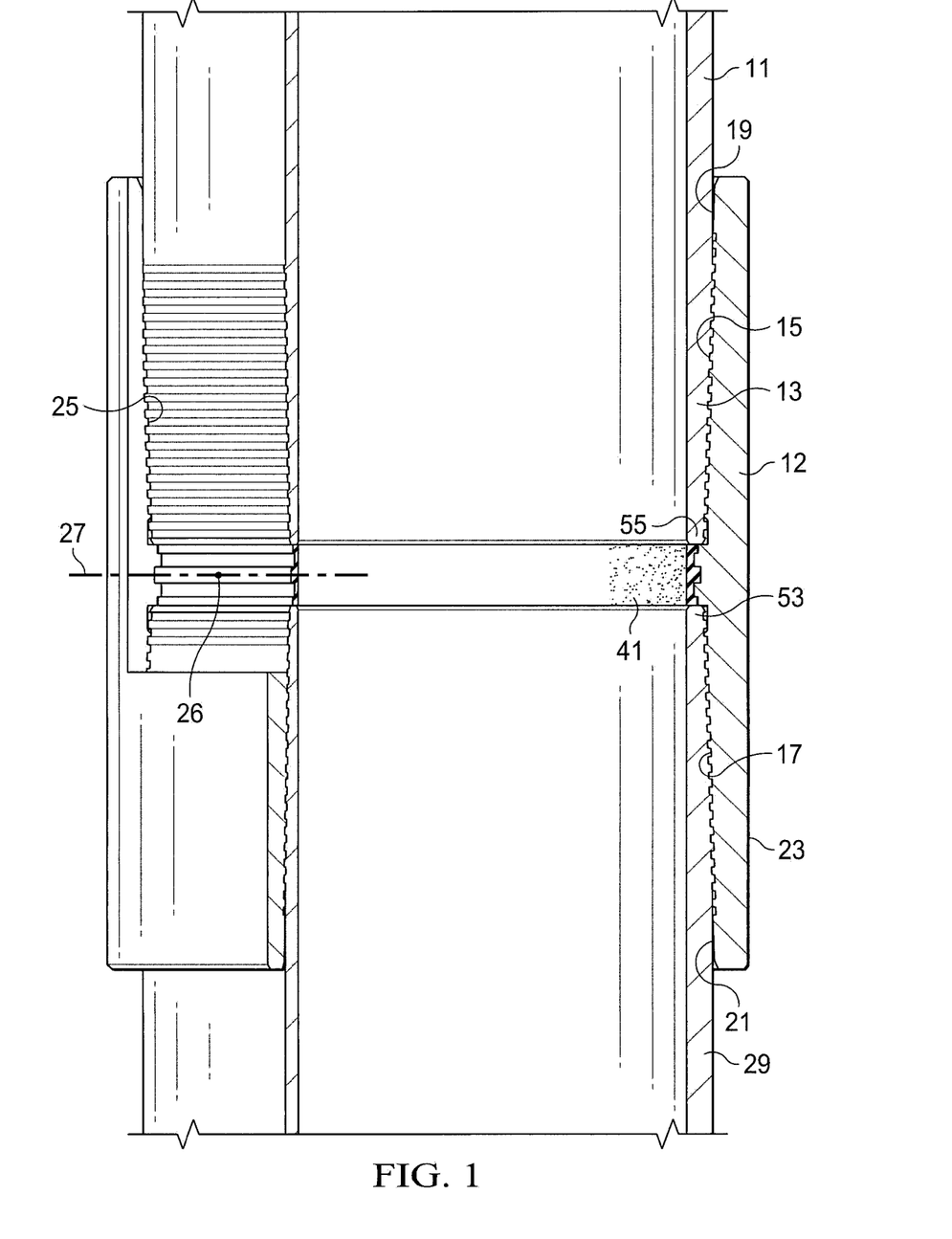
FIG. 1 is a side, cross sectional view of two pipe pin ends engaging a mating coupling of the invention, showing the seal ring which is located at the approximate center point of the interior of the coupling.

Turning now to FIG. 1 of the drawings, there is shown a first male pipe section 11 having an externally threaded pipe pin end 13. The pin end 13 will be threadedly engaged within one of the internally threaded surfaces 15, 17, of a female pipe section 12. As will be appreciated from FIG. 1, the female section of pipe 12 is, in this case, a coupling having opposing box ends 19, 21. The female pipe section is internally tapered and, as will be more fully described, has a cylindrical exterior 23, an interior 25, defined by an internal diameter having a center point 26 located along a transverse axis 27, the mid-point being located mid-way between the opposing ends 19,21 of the coupling. The opposing box ends 19, 21, each having internally threaded regions with internal threads which extend inwardly from each of the opposing ends toward the center point 26 of the coupling. The end opening 21 receives a second externally threaded pin pipe end (29 in FIG. 1).

As will be appreciated from FIG. 1, the pair of pipes 11, 29, each have pipe pin ends with external threads provided on the pin ends so that each pipe pin end can be axially aligned and received within a respective opposing end 19, 21, of the coupling member 12 with the pin end threads matingly engaging the internal threads of the coupling member 12 during make-up of the connection.

Figure 5:
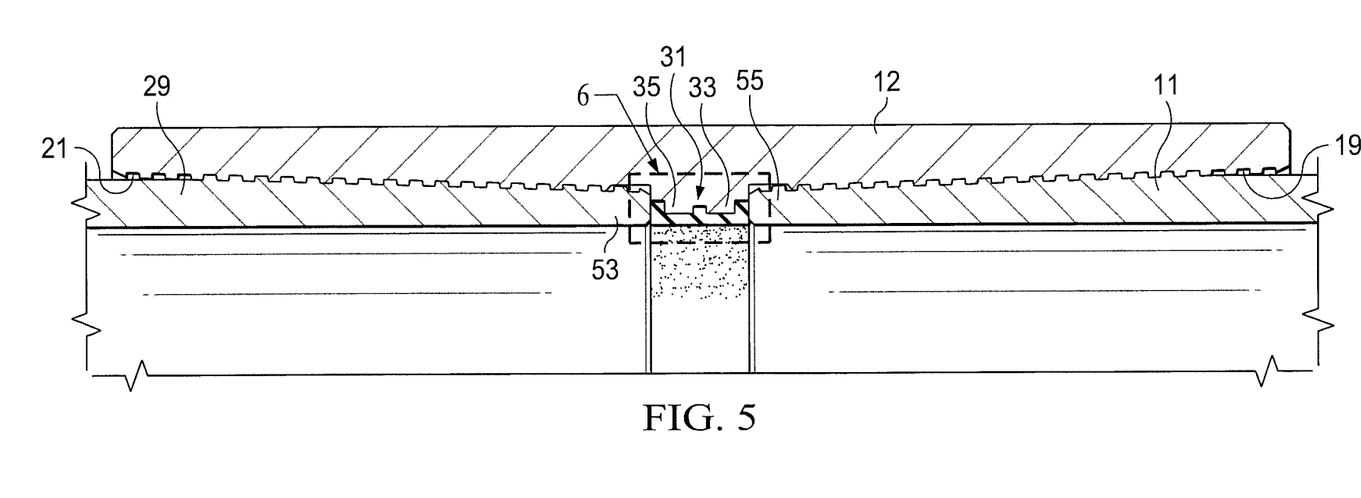
FIG. 5 is a quarter sectional view of the connection of the invention of FIG. 1, showing close-up detail of the seal region of the connection in the box indicated as "6."

As shown in FIG. 5, the cylindrical coupling member 12 is provided with a mid-region (generally at 31 in FIG. 5) of decreased internal diameter between the two opposing internally threaded regions 15, 17. The region of decreased internal diameter 31 forms an internal shoulder region integral with the coupling member 12. The internal shoulder region forms oppositely arranged stepped end faces 33, 35, joined by a diametral mid-region (best seen as 37 in FIG. 6) which forms an exposed circumferential face circumscribing the internal diameter of the mid-region of the coupling member.

The circumferential face of the internal shoulder region is provided with a centrally located groove (39 in FIG. 6) which circumscribes the face region. As will be appreciated from FIGS. 5 and 6, the oppositely arranged stepped end faces 33 and 35 of the internal shoulder region of the coupling member each form "double steps" on the oppositely arranged end faces 33, 35.

Figure 2:
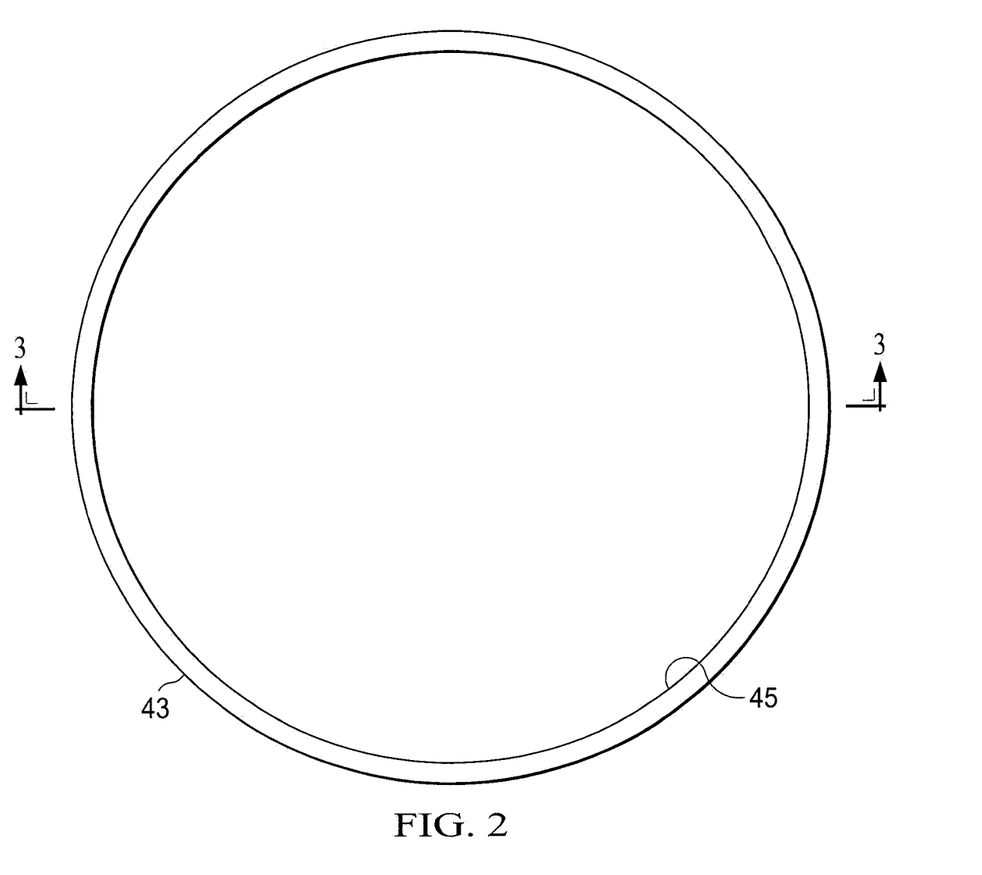
FIG. 2 is a top view of the seal ring used in the connection and method of the invention.
Figure 3:
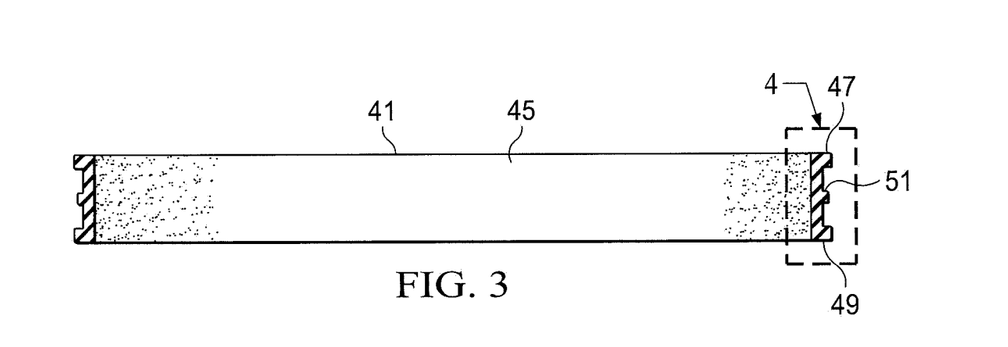
FIG. 3 is a side cross sectional view of the seal ring of the invention taken along lines 3-3 in FIG. 2.
Figure 4:
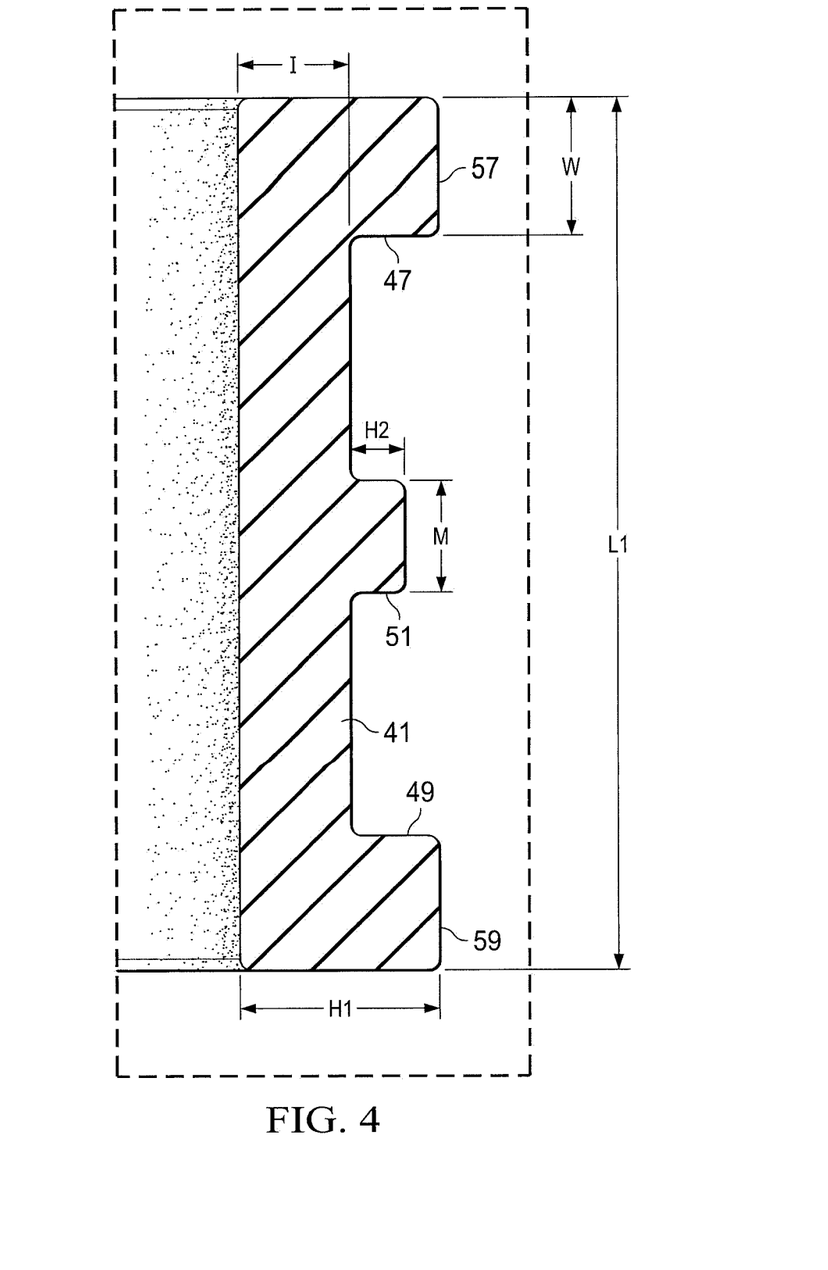
FIG. 4 is a close-up view of the end of the seal ring taken from the box indicated as "4' in FIG. 3.

A resilient, corrosion resistant seal ring 41 is received upon the circumferential face 37 of the internal shoulder region of the coupling member 12. The seal ring 4, as shown in FIGS. 2, 3 and 4, has a circumferential exterior face 43 and a circumferential interior face 45. The exterior face 43 of the ring has a pair of oppositely arranged protruding end regions (47, 49 in FIG. 3) and a central protruding region 51, which regions are arranged to mate with the oppositely arranged stepped end faces and centrally located groove, respectively, provided on the internal shoulder region of the cylindrical coupling member 12. This is shown in close-up fashion in FIGS. 6 and 7. The groove 39, as well as the double stepped faces of the internal shoulder of the coupling member help to hold the seal ring 41 on the shoulder region when the seal ring 41 is compressed between the pin ends (53 and in FIG. 1) of the axially aligned pipes when the connection is made-up.

The seal ring 41 can be formed of any of a number of suitable resilient compositions, but is preferably formed of a corrosion and oil resistant material, such as, for example, a polytetrafluoroethylene (PTFE). In the preferred tubular connection system of the invention, a corrosion resistant coating layer is also disposed at least on the inner peripheral surface of each of the pins and on the reduced diameter inner peripheral surface of the internal shoulder portion of the coupling. The coating layer might take many forms, depending upon the end application of the connection system, but might be formed, for example, of a synthetic resin, a synthetic rubber or a fiber-reinforced plastic.

As discussed briefly in the Background Description, prior art tubular connections of this same general type were often made-up using timing or "witness" marks, or by using elaborate gaging systems or electronic sensors or sensing systems. The present inventive method uses a much simpler system where the desired, final make-up position and amount of squeeze on the seal ring are controlled by utilizing the shoulder contact area of the pipe pin ends 53, 55 with the coupling internal shoulder regions and with the seal ring 41.

Figure 6:
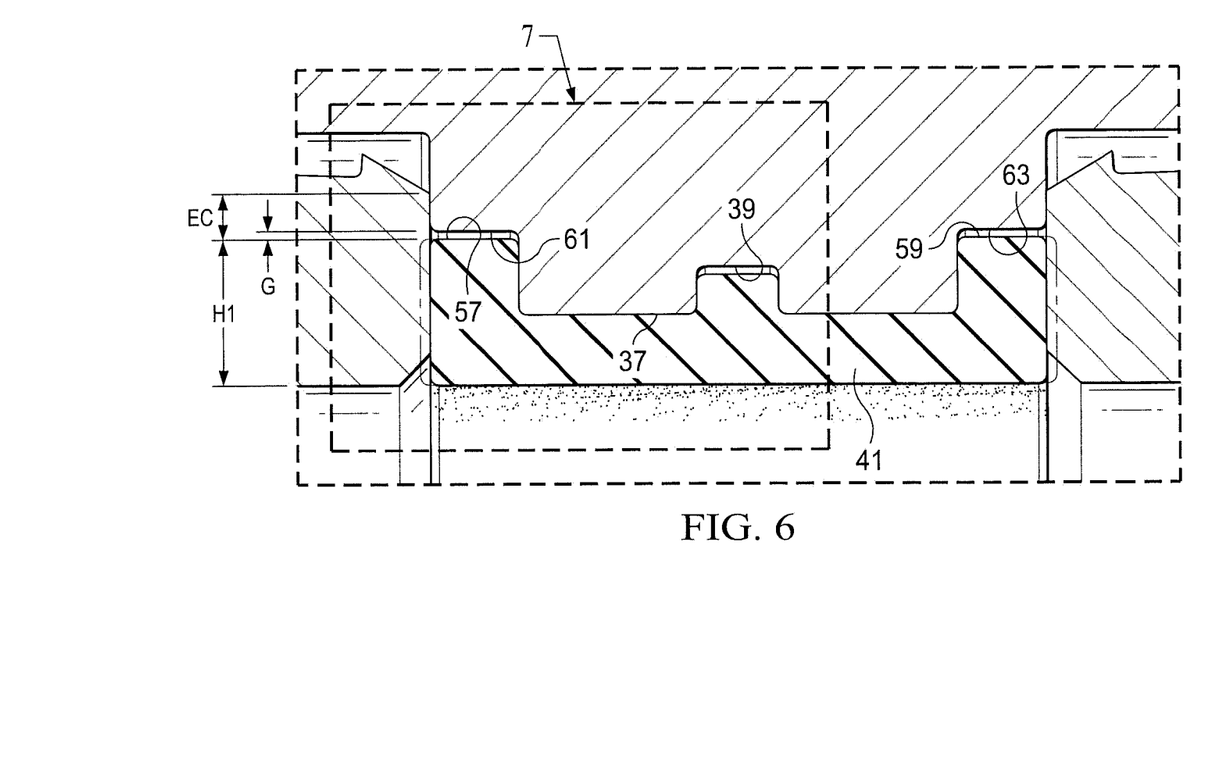
FIG. 6 is a close-up sectional view of a portion of the interior of the coupling of the invention, showing the contact between the outer end of the seal and the shoulder region of the coupling.
Figure 7:
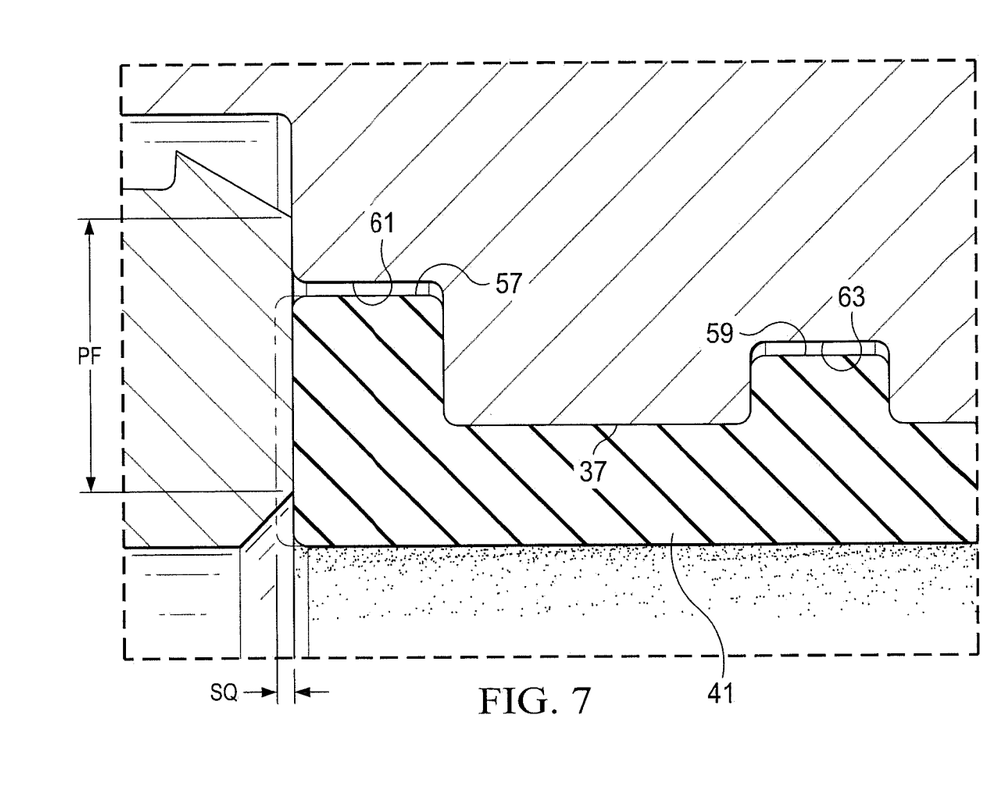
FIG. 7 is a more detailed cross-sectional view of the coupling region indicated by the box "7" in FIG. 6.

Several parameters are important which have been determined experimentally. The first is a "gap" of a predetermined size between the seal ring protruding regions and the shoulder region. With reference to FIGS. 4, 6 and 7, it can be seen that the oppositely arranged protruding end regions 47, 49, of the seal ring each have outer contact faces 57, 59, for contacting an adjacent step face 61, 63, of the shoulder region of the coupling member 12 as the coupling is made up. As shown in FIG. 6, a gap "g" initially exists between the outer contact faces 57, 59 of the oppositely arranged protruding end regions 47, 49, and the respective shoulder regions 61, 63, of the coupling. The gap "g" is of a predetermined width. In the example shown, the gap is in the range from about 0.001 to 0.010 inches, most preferably, approximately 0.005 inches. There is also a gap between the protrusion located in the mid-region (51 in FIGS. 3 and 4) of the seal ring and the groove (39 in FIG. 6) on the shoulder region of the coupling. This gap may initially be, for example, about 0.005 inches.

The width "SQ" in FIG. 7 represents the preferred amount of O-ring squeeze on the end faces of the seal ring. A squeeze of 0.012 inches has proved satisfactory for a range of coupling sizes. As the connection is made-up, the gaps close. However, squeeze on the seal ring 41 is controlled so that the seal ring is not squeezed out of the groove 37 and the seal ring is not displaced off the stepped shoulder regions of the coupling.

In addition to the controlled squeeze on the seal ring 41, there is another parameter that has an important impact on the design of the invention. This is what will be referred to as the "EC dimension." This length defines an "effective shoulder contact area" (see "EC" in FIG. 6) between the pipe pin ends (pin face) and the respective oppositely arranged stepped end faces of the shoulder region of the coupling member. This contact area is determined, in part, by the height of the selected end region of the seal ring.

Another critical dimension is the H1 dimension shown in FIG. 6. This length represents the "effective grip/squeeze area" of the ring. Different H1 lengths were tried in order to find the optimum "effective shoulder area." The optimum ring height and minimum ring thickness were also evaluated, which provides the rigidity of the ring. Note the length of H1 in FIG. 6. In the examples which follow, the height of the selected end region of the seal ring is in the range from about 0.090 to 0.180. In one preferred example, the height of the selected end region of the seal ring is approximately 0.156 inches.

These design features, i.e., "effective shoulder contact area" (EC) and "effective grip/squeeze area" (H1), are critical to the operation of the invention because too little "effective shoulder contact area" (EC) does not provide enough shoulder contact to protect the connection against make-up torque and would cause that part of the connection to deform or yield. Conversely, too much "effective shoulder contact area" (EC) causes a small H1 length which reduces the ring grip/squeeze between the pin face and the coupling groove. In other words, a large H1 length leads to a smaller "effective shoulder area" (EC) of the coupling due to the fixed pin face length. See, the pin face length "PF" in FIG. 7. Additionally, the proper amount of squeeze on each side of the seal ring keeps the ring in place without bulging. By properly selecting these parameters, the final make-up position of the connection and the amount of squeeze on the seal ring can be controlled by utilizing the proper shoulder contact area with the seal ring.

With reference to legends shown in FIG. 4 of the drawings, Table I below shows various experimental dimensions for exemplary seal rings of the type used in the practice of the invention:

TABLE 1

| Int | Ring H1 | Dash# | L1 | H1 | H2 | ID | W | T | M |
|---|---|---|---|---|---|---|---|---|---|
| 0.012 | 0.176 | −0001 | 0.774 | 0.176 | 0.045 | 7.921 | 0.117 | 0.100 | 0 098 |
| 0.020 | 0.176 | −0002 | 0.790 | 0.176 | 0.045 | 7.921 | 0.125 | 0.100 | 0.098 |
| 0.012 | 0.166 | −0003 | 0.774 | 0.166 | 0.045 | 7.921 | 0.117 | 0.100 | 0.098 |
| 0.020 | 0.166 | −0004 | 0.790 | 0.166 | 0.045 | 7.921 | 0.125 | 0.100 | 0 098 |
| 0.012 | 0.156 | −0005 | 0.774 | 0.156 | 0.045 | 7.921 | 0.117 | 0.100 | 0.098 |
| 0.020 | 0.156 | −0006 | 0.780 | 0.156 | 0.045 | 7.921 | 0.125 | 0.100 | 0.098 |

There is a small, sweet window for the H1 length (which is large enough to generate an adequate amount of ring grip/pinch to keep/hold the ring between the pin face and the coupling groove, and which leaves enough effective shoulder area (that can generate shouldering effect during the make-up process) and also enough room for the ring thickness. In the examples shown above, the dimensions of the ring shown as −0005 were the best configuration tested.

A method is also shown for connecting threaded sections of oil field pipe to form a coupled, make-up tubular connection having proper sealing positioning at proper make-up torque, where the connection is in the position shown in FIG. 1. In the fully engaged position, the pin member 13 has been rotated into coupling member 12 with a predetermined torque. In the fully engaged position, the pin end 55 of the pin member 13 contacts the seal ring 41 and squeezes it against the shoulder stop formed by the internal shoulder of the coupling member 12. The internal shoulder regions form a positive stopping point for pin members 11, 29, as they are threaded into coupling member 12.

In the make-up procedure, a selected box end of the tubular coupling is placed onto the first pin pipe end hand tight. Thereafter, a power torque device is typically used to torque the pipe coupling onto the first pipe spin end to a final position. That final position of the position made-up tubular connection is then verified to ensure that the final position is within a specified tolerance. The process is then repeated for the second pipe pin end and the opposite end of the tubular coupling. The final made-up position of the connection is determined by an observed amount of squeeze on the seal ring, the amount of squeeze being controlled by utilizing the shoulder contact area with the seal ring.

Figure 10:
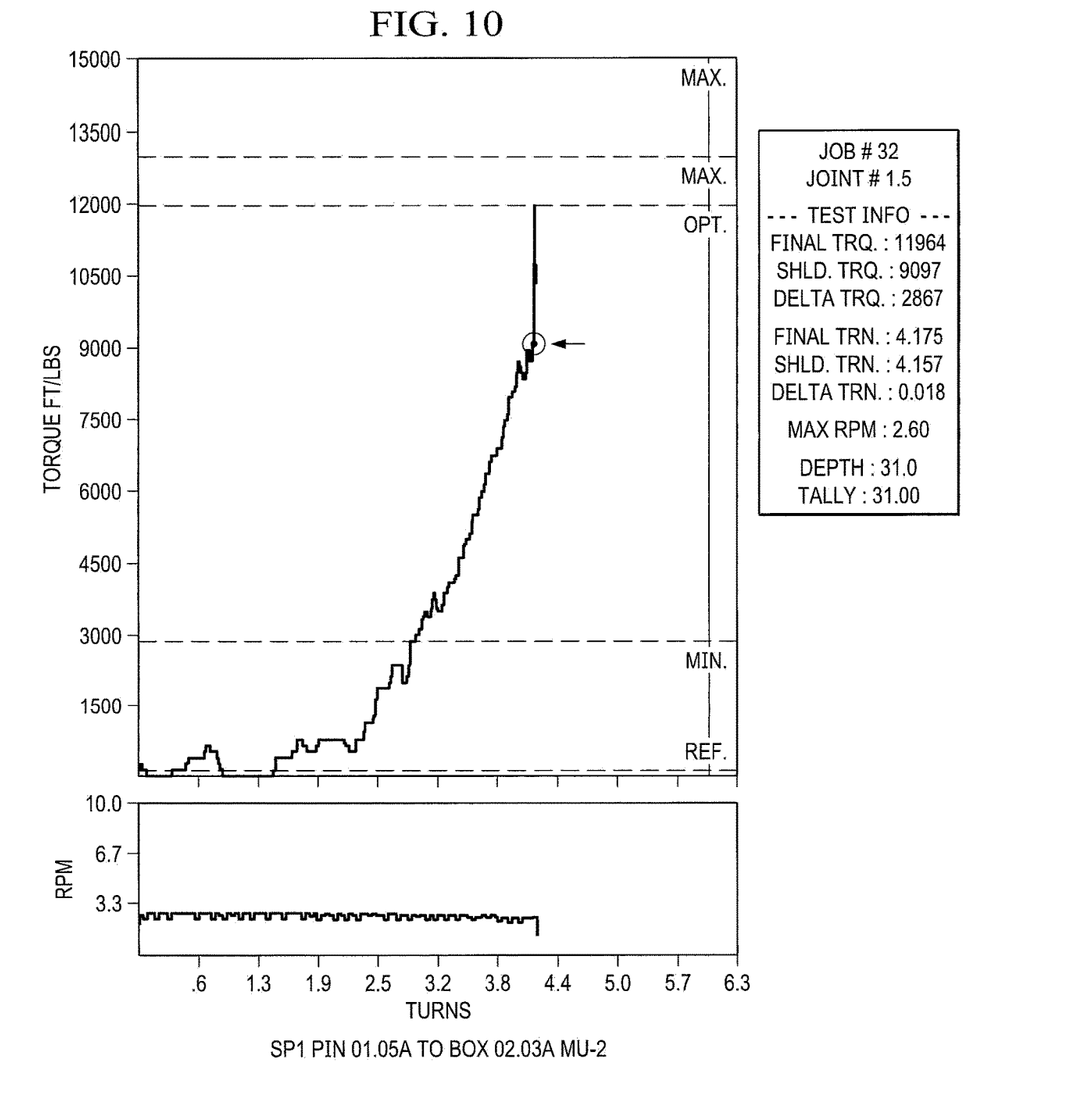
FIG. 10 is a Torque-Turn graph showing the parameters measured during a successful run.

FIG. 10 of the drawings shows exemplary make-up parameters for a successful run. The make and break procedure was for an 8.625" 32.00 #L80HC pipe. The procedure used was based upon the API RP 5C5:2017 specifications. Reference SLSF Running Procedures.

An invention has been provided with several advantages. The connection method of the invention is simple in application and gives dependable results. The method eliminates the use of timing marks which are often costly for field service operations. The components of the connection system of the invention have been found to provide higher compression and torsional resistance, a performance enhancement. The design of the internal shoulder region of the coupling member holds the seal ring in place and holds pressure to enhance sealing performance. The ring is precisely sized so as to not be deformed during make-up or use. The ring holds itself in place without having to be snapped into place in the groove, proving ease of installation.

While the invention has been shown in only one of its forms, it will be appreciated that it is not thus limited, but is susceptible to various changes and modifications without departing from the spirit thereof.

What is claimed is:

1. A threaded and coupled connection for oil field tubular goods, the connection comprising:
a cylindrical coupling member having an exterior, an interior defined by an internal diameter having a center point, and having opposing ends, the opposing ends each having internally threaded regions with internal threads which extend inwardly from each of the opposing ends toward the center point of the coupling member;
a pair of pipes having pipe pin ends with external threads provided on the pin ends so that each pipe pin end can be axially aligned and received within a respective opposing end of the coupling member with the pin end threads matingly engaging the internal threads of the coupling member;
wherein the cylindrical coupling member is provided with a mid-region of decreased internal diameter between the two opposing internally threaded regions, the region of decreased internal diameter forming an internal shoulder region integral with the coupling member, the internal shoulder region having oppositely arranged stepped end faces joined by a diametral mid-region which forms an exposed circumferential face region circumscribing the internal diameter of the mid-region of the coupling member, the circumferential face region having a centrally located groove which circumscribes the face region;
a resilient corrosion resistant seal ring having a circumferential exterior face and a circumferential interior face, the exterior face of the ring having a pair of oppositely arranged protruding end regions and a central protruding region which regions are arranged to mate with the oppositely arranged stepped end faces and centrally located groove, respectively, provided on the internal shoulder region of the cylindrical coupling member to receive the stepped faces and hold the ring on the shoulder region when the seal ring is compressed between the pin ends of the axially aligned pipes when the connection is made-up; and
wherein the connection has a desired, final make-up position, and wherein this final make-up position and amount of squeeze on the seal ring are controlled by utilizing a shoulder contact between the pin ends and the shoulder region of the coupling member.

2. The threaded and coupled connection of claim 1, wherein the oppositely arranged stepped end faces of the internal shoulder region of the coupling member each form double steps on the oppositely arranged end faces.

3. The threaded and coupled connection of claim 2, wherein the seal ring is polytetrafluoroethylene.

4. A threaded and coupled connection for oil field tubular goods, the connection comprising:
a cylindrical coupling member having an exterior, an interior defined by an internal diameter having a center point, and having opposing ends, the opposing ends each having internally threaded regions with internal threads which extend inwardly from each of the opposing ends toward the center point of the coupling member;

a pair of pipes having pipe pin ends with external threads provided on the pin ends so that each pipe pin end can be axially aligned and received within a respective opposing end of the coupling member with the pin end threads matingly engaging the internal threads of the coupling member;

wherein the cylindrical coupling member is provided with a mid-region of decreased internal diameter between the two opposing internally threaded regions, the region of decreased internal diameter forming an internal shoulder region integral with the coupling member, the internal shoulder region having oppositely arranged stepped end faces joined by a diametral mid-region which forms an exposed circumferential face region circumscribing the internal diameter of the mid-region of the coupling member, the circumferential face region having a centrally located groove which circumscribes the face region;

a resilient corrosion resistant seal ring having a circumferential exterior face and a circumferential interior face, the exterior face of the ring having a pair of oppositely arranged protruding end regions and a central protruding region which regions are arranged to mate with the oppositely arranged stepped end faces and centrally located groove, respectively, provided on the internal shoulder region of the cylindrical coupling member to receive the projections and hold the ring on the shoulder region when the seal ring is compressed between the pin ends of the axially aligned pipes when the connection is made-up; and wherein the oppositely arranged protruding end regions of the seal ring each have outer contact faces for contacting an adjacent stepped face of the shoulder region of the coupling member as the coupling member is made up and wherein a gap initially exists between the oppositely arranged protruding end regions of the seal ring and exposed circumferential face regions of the exposed circumferential face, the gap being of a predetermined width, whereby the connection has a desired, final make-up position and amount of squeeze on the seal ring are controlled by utilizing a shoulder contact with the pipe pin ends as the connection is made up.

5. The threaded and coupled connection of claim 4, wherein the gap accommodates a squeeze region defined between the end faces of the seal ring and the pin end faces, the squeeze region being in the range from about 0.010 inches to 0.015 inches.

6. The threaded and coupled connection of claim 5, wherein the squeeze region is approximately 0.012 inches.

7. A threaded and coupled connection for oil field tubular goods, the connection comprising:

a cylindrical coupling member having an exterior, an interior defined by an internal diameter having a center point, and having opposing ends, the opposing ends each having internally threaded regions with internal threads which extend inwardly from each of the opposing ends toward the center point of the coupling member;

a pair of pipes having pipe pin ends with external threads provided on the pin ends so that each pipe pin end can be axially aligned and received within a respective opposing end of the coupling member with the pin end threads matingly engaging the internal threads of the coupling member;

wherein the cylindrical coupling member is provided with a mid-region of decreased internal diameter between the two opposing internally threaded regions, the region of decreased internal diameter forming an internal shoulder region integral with the coupling member, the internal shoulder region having oppositely arranged stepped end faces joined by a diametral mid-region which forms an exposed circumferential face region circumscribing the internal diameter of the mid-region of the coupling member, the circumferential face region having a centrally located groove which circumscribes the face region;

a resilient corrosion resistant seal ring having a circumferential exterior face and a circumferential interior face, the exterior face of the ring having a pair of oppositely arranged protruding end regions and a central protruding region which regions are arranged to mate with the oppositely arranged stepped end faces and centrally located groove, respectively, provided on the internal shoulder region of the cylindrical coupling member to receive the projections and hold the ring on the shoulder region when the seal ring is compressed between the pin ends of the axially aligned pipes when the connection is made-up;

wherein the oppositely arranged protruding end regions of the seal ring each have outer contact faces for contacting an adjacent stepped face of the shoulder region of the coupling member as the connection is made up and wherein a gap initially exists between the outer contact faces of the oppositely arranged protruding end regions and the respective shoulder regions of the coupling member, the gap being of a predetermined width, whereby the connection has a desired, final make-up position, and wherein this final make-up position and the amount of squeeze on the seal ring are controlled by utilizing a shoulder contact between the pin ends and the shoulder region of the coupling member; and wherein there is a defined effective shoulder contact area between the pipe pin ends and the respective oppositely arranged stepped end faces of the shoulder region of the coupling member, that area being determined, in part, by a height of a selected end region of the seal ring.

8. The threaded and coupled connection of claim 7, wherein the height of the selected end region of the seal ring is in the range from about 0.150 inches to 0.180 inches.

9. The threaded and coupled connection of claim 8, wherein the height of the selected end region of the seal ring is approximately 0.156 inches.

10. A method of connecting threaded pipe sections to form a coupled, made-up tubular connection having proper sealing positioning at proper make-up torque where the connection is a position make-up connection, the method comprising the steps of:

providing a cylindrical coupling member having an exterior, an interior defined by an internal diameter having a center point, and having opposing ends, the opposing ends each having internally threaded regions with internal threads which taper inwardly from each of the opposing ends toward the center point of the coupling member so as to mate with external threads provided on pin ends of two axially aligned pipes to be joined by the coupling member;

wherein the cylindrical coupling member is provided with a mid-region of decreased internal diameter between the two opposing internally threaded regions which forms an internal shoulder region integral with the coupling member; the internal shoulder region having oppositely arranged stepped end faces joined by a diametral mid-region which forms an exposed circumferential face region circumscribing the internal diameter of the mid-region of the coupling member, the circumferential face region having a centrally located groove which circumscribes the face region;

providing a resilient, corrosion resistant seal ring having a pair of oppositely arranged end protruding regions and a central protruding region which are arranged to mate with the oppositely arranged stepped end faces and centrally located groove, respectively, provided on the internal shoulder region of the cylindrical coupling member to hold the ring on the shoulder region when the seal ring is compressed between the pin ends of the axially aligned pipes as the connection is made-up;

wherein the connection has a desired final make-up position, which position and the amount of squeeze on the seal ring being controlled by utilizing a shoulder contact between the pipe pin ends and the shoulder region of the coupling member.

11. A method of connecting threaded sections of oil field pipe to form a coupled, made-up tubular connection having proper sealing positioning at proper make-up torque where the connection is a position make-up connection, the method comprising the steps of:

providing a first section of pipe in the form of a pipe pin member including an externally threaded pipe pin end;

providing a second section of pipe in the form of an identical pipe pin end of the first section of pipe;

providing a cylindrical tubular coupling member having oppositely arranged internally threaded box ends;

installing a selected box end of the tubular coupling member onto the first pin pipe end of the first section of pipe hand tight;

thereafter using a power torque device to torque the tubular coupling member onto the first pipe pin end of the first section of pipe to a final position;

verifying the final position of the position made-up tubular connection to ensure that the final position is within a specified tolerance;

repeating the same steps in the process installing, using a power torque device and verifying as previously recited for the first pipe end for the second pipe pin end of the second section of pipe and the opposite end of the tubular coupling member;

wherein the cylindrical tubular coupling member has an exterior, an interior defined by an internal diameter having a center point, and the internally threaded box ends tapering inwardly from each of the opposing box ends toward the center point of the cylindrical coupling member so as to mate with external threads provided on the pin ends of the first section of pipe and the second section of pipe defining two axially aligned pipes to be joined by the cylindrical tubular coupling member;

wherein the cylindrical tubular coupling member is provided with a mid-region of decreased internal diameter between the two opposing internally threaded regions which forms an internal shoulder region integral with the cylindrical tubular coupling member; the internal shoulder region having oppositely arranged stepped end faces joined by a diametral mid-region which forms an exposed circumferential face region circumscribing the internal diameter of the mid-region of the cylindrical tubular coupling member, the circumferential face region having a centrally located groove which circumscribes the face region;

providing a resilient, corrosion resistant seal ring having a pair of oppositely arranged end protruding regions and a central protruding region which are arranged to mate with the oppositely arranged stepped end faces and centrally located groove, respectively, provided on the internal shoulder region of the cylindrical tubular coupling member to hold the ring on the shoulder region when the seal ring is compressed between the pin ends of the axially aligned pipes as the connection is made-up;

wherein the connection has a final, desired make-up position, which position and the amount of squeeze on the seal ring are controlled by utilizing a shoulder contact between the pin ends and the shoulder region of the cylindrical tubular coupling member;

wherein the oppositely arranged protruding end regions of the seal ring each have outer contact faces for contacting an adjacent stepped face of the shoulder region of the cylindrical tubular coupling member as the connection is made up and wherein a gap initially exists between the oppositely arranged protruding end regions of the seal ring and the exposed circumferential face of the cylindrical tubular coupling member, the gap being of a predetermined width, whereby the connection has a desired, final make-up position and desired amount of squeeze on the seal ring, both of which are controlled by utilizing the contact between the pipe pin ends and the shoulder region of the cylindrical tubular coupling member.

12. The method of claim 11, wherein the gap accommodates a squeeze region defined between the end faces of the seal ring and the pin end faces, the squeeze region being in the range from about 0.010 inches to 0.015 inches.

13. The method of claim 12, wherein the squeeze region is approximately 0.012 inches.

14. The method of claim 11, wherein there is a defined effective shoulder contact area between the pipe pin ends and the respective oppositely arranged stepped end faces of the shoulder region of the cylindrical tubular coupling member, the area being determined, in part, by a height of a selected end region of the seal ring.

15. The method of claim 14, wherein the height of the selected end region of the seal ring is in the range from about 0.150 inches to 0.180 inches.

16. The method of claim 15, wherein the height of the selected end region of the seal ring is approximately 0.156 inches.

17. The method of claim 11, wherein the oppositely arranged stepped end faces of the internal shoulder region of the cylindrical tubular coupling member each form double steps on the oppositely arranged end faces.

18. The method of claim 11, wherein the seal ring is formed of polytetrafluoroethylene.

* * * * *